United States Patent
Zompakis

(10) Patent No.: US 10,740,519 B2
(45) Date of Patent: Aug. 11, 2020

(54) DYNAMIC FREQUENCY BOOSTING EXPLOITING PATH DELAY VARIABILITY IN INTEGRATED CIRCUITS

(71) Applicant: Nikolaos Zompakis, Athens (GR)

(72) Inventor: Nikolaos Zompakis, Athens (GR)

(73) Assignee: TRIMSIGNAL IP LLC, Tampa, FL (US)

( * ) Notice: Subject to any disclaimer, the term of this patent is extended or adjusted under 35 U.S.C. 154(b) by 362 days.

(21) Appl. No.: 15/644,760

(22) Filed: Jul. 8, 2017

(65) Prior Publication Data

US 2018/0096086 A1    Apr. 5, 2018

Related U.S. Application Data

(60) Provisional application No. 62/359,814, filed on Jul. 8, 2016.

(51) Int. Cl.
| | |
|---|---|
| *G06F 30/398* | (2020.01) |
| *G06F 30/3312* | (2020.01) |
| *G06F 1/08* | (2006.01) |
| *G06F 1/3206* | (2019.01) |
| *G06F 1/324* | (2019.01) |
| *G06F 30/327* | (2020.01) |
| *G06F 30/394* | (2020.01) |
| *G06F 111/04* | (2020.01) |
| *G06F 119/12* | (2020.01) |

(52) U.S. Cl.
CPC .......... *G06F 30/3312* (2020.01); *G06F 1/08* (2013.01); *G06F 1/324* (2013.01); *G06F 1/3206* (2013.01); *G06F 30/327* (2020.01); *G06F 30/394* (2020.01); *G06F 30/398* (2020.01); *G06F 2111/04* (2020.01); *G06F 2119/12* (2020.01); *Y02D 10/126* (2018.01)

(58) Field of Classification Search
USPC ........................................................ 716/134
See application file for complete search history.

(56) References Cited

U.S. PATENT DOCUMENTS 8,413,086 B2 * 4/2013 Barry .................. G06F 9/30145
716/104

OTHER PUBLICATIONS

Ghosh S. et al: "CRISTA: A New Paradigm for Low-Power, Variation-Tolerant, and Adaptive Circuit Synthesis using Critical Path Isolation", IEEE Transactions on Computer Aided Design of Integrated Circuits and Systems, IEEE Service Center, Piscattaway, NJ, US, vol. 26, No. 11, Nov. 1, 2007 (Nov. 1, 2007), pp. 1947-1956.

(Continued)

*Primary Examiner* — Eric D Lee
(74) *Attorney, Agent, or Firm* — Franco S. De Ligueri; DP IP Group

(57) ABSTRACT

The disclosure is directed to the design and manufacture of synchronous digital systems, such as integrated circuits (IC), to employ dynamic frequency boosting. The proposed technique overcomes limitations of conventional synchronous clock design by boosting operating clock frequency despite critical path time constraints and without violating the correct functionality. In accordance with an exemplary embodiment, ICs are configured to set the clock frequency during each state event by selecting a more optimum clock frequency, on a clock cycle basis, thus improving system performance in terms of throughput while maintaining the benefits and design approach of synchronous digital systems.

15 Claims, 11 Drawing Sheets

(56) References Cited

OTHER PUBLICATIONS

Jeremy Constantin et al: "Exploiting Dynamic Timing Margins in Microprocessors for Frequency-Over-Scaling with Instruction -Based Clock Adjustment", Mar. 9, 2015-Mar. 13, 2015, Mar. 9, 2015 (Mar. 9, 2015), pp. 381-386. ISBN: 378-3-9815370-4-8.
Chippa Vinay et al: "Approximate Computing: An Integrated Hardware Approach", 2013 Asilomar Conference on Signals, Systems and Computers, IEEE, Nov. 3, 2013 (Nov. 3, 2013), pp. 111-117.
Alexandru Gheolbanoiu et al: "Hybrid Adaptive Clock Management for FPGA Acceleration", Mar. 9, 2015-Mar. 13, 2015, Mar. 9, 2015 (Mar. 9, 2015), pp. 1359-1364. ISBN: 978-3-9815370-4-8.
PCT International Search Report and Written Opinion of the International Searching Authority in connection with PCT counterpart PCT/GR/2017/000038, which claims the benefit of priority of above identified application. dated Oct. 17, 2017.

* cited by examiner

| A | B | C | D | F | |
|---|---|---|---|---|---|
| 0 | 0 | 0 | 0 | 1 | F=D' |
| 0 | 0 | 0 | 1 | 0 | |
| 0 | 0 | 1 | 0 | 0 | F=D |
| 0 | 0 | 1 | 1 | 1 | |
| 0 | 1 | 0 | 0 | 1 | 1 |
| 0 | 1 | 0 | 1 | 1 | |
| 0 | 1 | 1 | 0 | 0 | F=D |
| 0 | 1 | 1 | 1 | 1 | |
| 1 | 0 | 0 | 0 | 0 | F=D |
| 1 | 0 | 0 | 1 | 1 | |
| 1 | 0 | 1 | 0 | 0 | F=0 |
| 1 | 0 | 1 | 1 | 0 | |
| 1 | 1 | 0 | 0 | 1 | F=D' |
| 1 | 1 | 0 | 1 | 0 | |
| 1 | 1 | 1 | 0 | 1 | F=1 |
| 1 | 1 | 1 | 1 | 1 | |

$$y = \bar{A}.\bar{C}.\bar{D} + \bar{A}.C.D + \bar{A}.B\bar{C} + B.C.D + A.B.\bar{D} + A.\bar{B}.\bar{C}.D$$

DYNAMIC FREQUENCY BOOSTING EXPLOITING PATH DELAY VARIABILITY IN INTEGRATED CIRCUITS

RELATED APPLICATIONS

This application claims the benefit of U.S. Provisional Application No. 62/359,814, filed on Jul. 8, 2016, entitled "A DYNAMIC FREQUENCY BOOSTING METHOD EXPLOITING PATH DELAY VARIABILITY IN INTEGRATED CIRCUITS", commonly owned and assigned to the same assignee hereof.

FIELD

The present disclosure relates to techniques for optimizing clock speed in integrated circuits.

BACKGROUND

Electronic design automation (EDA), also referred to as electronic computer-aided design (ECAD), is a category of software tools for designing electronic systems such as integrated circuits and printed circuit boards. The tools work together in a design flow that chip designers use to design and analyze entire semiconductor chips. Considering that today's semiconductor chips can have billions of components, EDA tools are essential for their design.

Although the languages and tools of EDA tools have evolved significantly over the years, the general approach of specifying the desired behavior in a textual programming language and letting the tools derive the detailed physical design remains the basis of digital IC design today.

While the goal is for a physical design to work properly—meaning all the functionalities are performed as intended—this is not always the case. Designers also employ electronic circuit simulation tools which are essentially mathematical models used to replicate the behavior of an actual electronic device or circuit. In this regard, simulation tools allow for modeling of circuit operation and are an invaluable analysis tool. Simulating a circuit's behavior before actually building it can greatly improve design efficiency by making faulty designs known as such, and providing insight into the behavior of electronics circuit designs. In particular, for integrated circuits, the tooling (photomasks) is expensive, breadboards are impractical, and probing the behavior of internal signals is extremely difficult. Therefore, almost all IC design relies heavily on simulation.

Static timing analysis (STA) is a simulation method of computing the expected timing of a digital circuit without requiring a simulation of the full circuit.

High-performance integrated circuits have traditionally been characterized by the clock frequency at which they operate. Gauging the ability of a circuit to operate at the specified speed requires an ability to measure, during the design process, path delay along relevant routes (critical paths). Moreover, delay calculation must be incorporated into the inner loop of timing optimizers at various phases of design, such as logic synthesis, layout (placement and routing), and in in-place optimizations performed late in the design cycle. Static timing analysis plays a vital role in facilitating the fast and reasonably accurate measurement of circuit timing.

For proper circuit operation in a typical synchronous digital system, data is supposed to move in lockstep, advancing one stage on each cycle of the clock signal. This is enforced by synchronizing elements such as flip-flops or latches, which copy their input to their output when instructed to do so by the clock. Only two kinds of timing errors are possible in such a system. One such error is a setup time violation, which is when a signal arrives too late, and misses the time when it should advance. The other error is a hold time violation, which is when an input signal changes too soon after the clock's active transition.

The time when a signal arrives can vary due to many reasons—the input data may vary, the circuit may perform different operations, the temperature and voltage may change, and there are manufacturing differences in the exact construction of each part. The main goal of static timing analysis is to verify that despite these possible variations, all signals will arrive neither too early nor too late, and hence proper circuit operation can be assured.

Because static time analysis is capable of verifying every path, it can detect other problems like glitches, slow paths and clock skew.

A "critical" path is defined as the path between an input and an output with the maximum delay. Once the circuit timing is determined for a set of paths of varying propagation delay, the critical path can easily be found by using a traceback method.

The arrival time of a signal is the time elapsed for a signal to arrive at a certain point. The reference, or time 0.0, is often taken as the arrival time of a clock signal. To calculate the arrival time, delay calculation of all the components in the path will be required. Arrival times, and indeed almost all times in timing analysis, are normally kept as a pair of values—the earliest possible time at which a signal can change, and the latest.

Another useful concept is required time. This is the latest time at which a signal can arrive without making the clock cycle longer than desired. The computation of the required time proceeds as follows: at each primary output, the required times for rise/fall are set according to the specifications provided to the circuit. Next, a backward topological traversal is carried out, processing each gate when the required times at all of its fanouts are known.

The slack associated with each connection is the difference between the required time and the arrival time. A positive slack s at some node implies that the arrival time at that node may be increased by s, without affecting the overall delay of the circuit. Conversely, negative slack implies that a path is too slow, and the path must be sped up (or the reference signal delayed) if the whole circuit is to work at the desired speed.

In static timing analysis, the word static alludes to the fact that this timing analysis is carried out in an input-independent manner, and purports to find the worst-case delay of the circuit over all possible input combinations. During IC operation, electrical signals traverse the IC through the various paths established by the chip designer according to the functions supported by the IC.

The worst-case delay determines the fastest clock speed the IC—or, in some cases, a particular section of a chip—can operate. To ensure that all propagating electrical signals are consistently arriving at their destinations in one clock cycle, the maximum clock frequency that may be used is the one that corresponds to a time period that does not exceed the critical path delay.

The increasing integration scale of modern ICs has led to remarkable increase in the number of paths used to carry and process signals within a chip. EDA tools employ known techniques which help to equalize path delays to some extent, however the design complexity is normally such that some paths inherently have significantly smaller or greater propagation delay than other paths. As such, optimum path equalization is nothing more than a design tradeoff involving chip area constraints, performance (e.g., selecting the highest possible clock frequencies without impacting chip functions), power and/or energy consumption (where the goal may be to reduce clock speed where conservation is a key objective).

As far as chip area constraints, it is known for example to group and pipeline paths by adding gates and other logic to process functions in parallel. While pipelining would normally involve increasing chip area to account for extra registers and other logic circuitry, the fact that certain pipelines may allow an entire clock cycle stage to operate at a higher clock frequency may more than offset, from a design standpoint, any chip size increase.

Conventional integrated circuits and like synchronous digital systems sometimes employ heuristic design algorithms that aim to exploit the slack between the path delays to succeed more efficient implementations. The design complexity to equalize the path delays due to the growing scaling of the IC designs makes the deviations between the path delays a reality.

An asynchronous circuit (or self-timed circuit) differs from a synchronous circuit in that it is a sequential digital logic circuit which is not governed by a clock circuit or global clock signal. Instead, asynchronous circuits use signals that indicate completion of instructions and operations, specified by simple data transfer protocols.

Synchronous design offers low design complexity using a common clock signal, discrete (synchronous) time operation, and a design that may be supported with available automation tools. Asynchronous design, on the other hand, offers performance benefits for large scale integrated circuits with great path delay variability. One disadvantage of synchronous design is the fact that clock frequency is necessarily dependent on critical path delay. In the case of asynchronous design, disadvantages include high design complexity, non-discrete time (asynchronous) operation, and lack of automated tools to support the design.

There is a need to operate synchronous digital systems in yet more optimized manner and address the challenges imposed by critical path delay limitations.

SUMMARY

The present disclosure is directed to the design and manufacture of synchronous digital systems, such as integrated circuits (IC), to employ dynamic frequency boosting. The proposed technique overcomes limitations of conventional synchronous clock design by boosting operating clock frequency despite critical path time constraints and without violating the correct functionality.

In accordance with an exemplary embodiment, ICs are configured to set the clock frequency during each state event by selecting a more optimum clock frequency, on a clock cycle basis, thus improving system performance in terms of throughput while maintaining the benefits and design approach of synchronous digital systems.

The proposed techniques exploit the fact that the critical path is not a constant tight constraint for the clock cycle period during the operation of an integrated circuit. The reason is that the electrical signals that traverse the circuit paths do not switch their states at each clock cycle. The stable path signals have a constant value independent of the applied clock frequency and only signal value switches need a time equal to the path delay to be propagated. Accordingly, if the signal that traverses the critical path is stable for a sequence of clock cycles for these clock cycles, the IC can operate in a higher frequency than the critical path imposes without concerning about the stability of the critical path signal in its destination. Thus, an integrated circuit can adjust the clock cycle period based on the propagation delay of the path signals that change their states.

More particularly, the IC is allowed to adjust its operating frequency, on a clock cycle basis, over the critical path constraint without introducing or giving rise to possible functionality errors. In an alternate embodiment, some flexibility is introduced for additional performance boost by allowing for some minor errors in functionality that may be tolerated and do not impact overall performance.

The proposed approach achieves clock frequency boosting by taking advantage of a priori knowledge of circuit path inputs as well as the electrical signal change conditions with respect to certain nodes defined as intersection nodes just prior to setting the clock frequency for the next clock cycle operation of the IC.

In one approach, the identification of all the circuit path inputs and the change conditions at all intersection nodes in the targeted IC is not a requirement. A descending exploration of the path delays starting hierarchically from the critical path to shorter paths ensures that all the significant propagation delays are considered. With that said, a wider exploration of circuit paths may provide an opportunity in some cases for more aggressive frequency boosting.

For each explored path, the technique examines the intersection nodes with the other paths that are included at the descending exploration of the path delays. As intersection node is identified a point in the IC where more than one path pass. In these nodes, a multiplexer defines which path will pass or not. If a multiplexer does not exist as a physical entity the equivalent of a multiplexer can be defined. Accordingly, the combinational logic of the paths to pass an intersection node can also be formulated as a multiplexer function. The control signals of the multiplexer define which paths will pass or not. These control signals can be part of other paths in others intersection nodes and can be controlled by other path signals. A recursive exploration of the control signals concludes to initial parent signals that act as a primer control for the examined paths. Each parent signal can control multiple paths with corresponding propagation delays. The highest propagation delay that is correlated with a parent signal defines the maximum operating frequency that this parent signal can trigger.

A frequency boosting decision is taken based on how the path signals switch their states. A scheduler traces these changes to automatically trigger a respective clock frequency in a clock cycle basis. The longest path under the influence of certain parent control signals are determinative in terms of the maximum clock frequency that may be achieved. The aim is to ensure the in-time propagation and the loading of all the path signals at their destinations in a single clock cycle period.

In a preferred approach, a clock scheduler is employed to adapt the clock frequency. Additional input registers may be added before the source registers of a combinational circuit to allow the scheduler more time (in terms of additional cycles) to to trace and process the current last cycle feeds to the scheduler where one cycle only is insufficient for the hardware logic of the scheduler to complete the process.

To simplify design complexity of the present invention particularly in large scale ICs, the proposed approach to IC design may be easily integrated into existing EDA tools. In an alternate commercialization approach, the proposed approach is a distinct EDA support tool offering (or plug-in)

configured to be able to update netlist definitions created by mainstream commercial EDA tools.

BRIEF DESCRIPTION OF THE DRAWINGS

The present invention may be better understood, and its numerous features and advantages made apparent by referencing the accompanying drawings. For ease of understanding and simplicity, common numbering of elements within the illustrations is employed where an element is the same in different drawings.

DETAILED DESCRIPTION

Detailed descriptions of the current invention embodiments follow. Each description refers to the aforementioned figures to provide an illustrative view of the present invention. The scope is to teach and to provide clear directions about the application of the proposed technique and to deal with the potential design issues. All modifications, adaptations, or variations that rely upon the teachings of the current invention, which teachings have advanced the art, are considered to be within the spirit and scope of the present invention. Hence, these descriptions and drawings are not to be considered in a limiting sense, as it is understood that the present invention is in no way limited to the illustrated embodiments.

The word "exemplary" is used herein to mean "serving as an example, instance, or illustration." Any embodiment described herein as "exemplary" is not necessarily to be construed as preferred or advantageous over other embodiments. It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a", "an" and "the" include both singular and plural referents, unless the context clearly dictates otherwise. Thus, for example, "a system" or "a device" includes one system or device as well as plural systems or devices.

Figure 1:
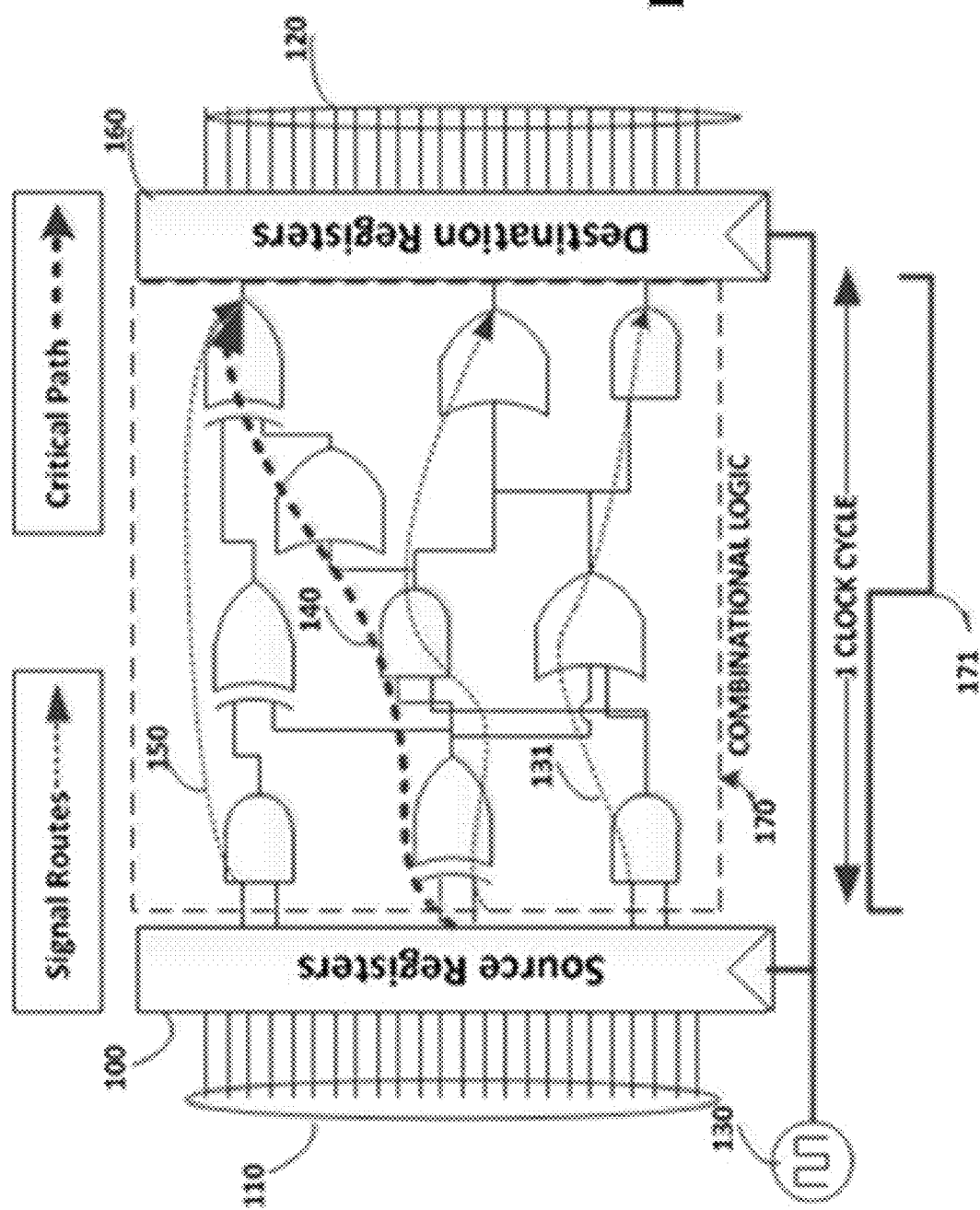
FIG. 1 is a high-level schematic diagram of an exemplary, conventional synchronous digital system.

FIG. 1 is a high-level schematic diagram of an exemplary, conventional synchronous digital system.

Figure 2:
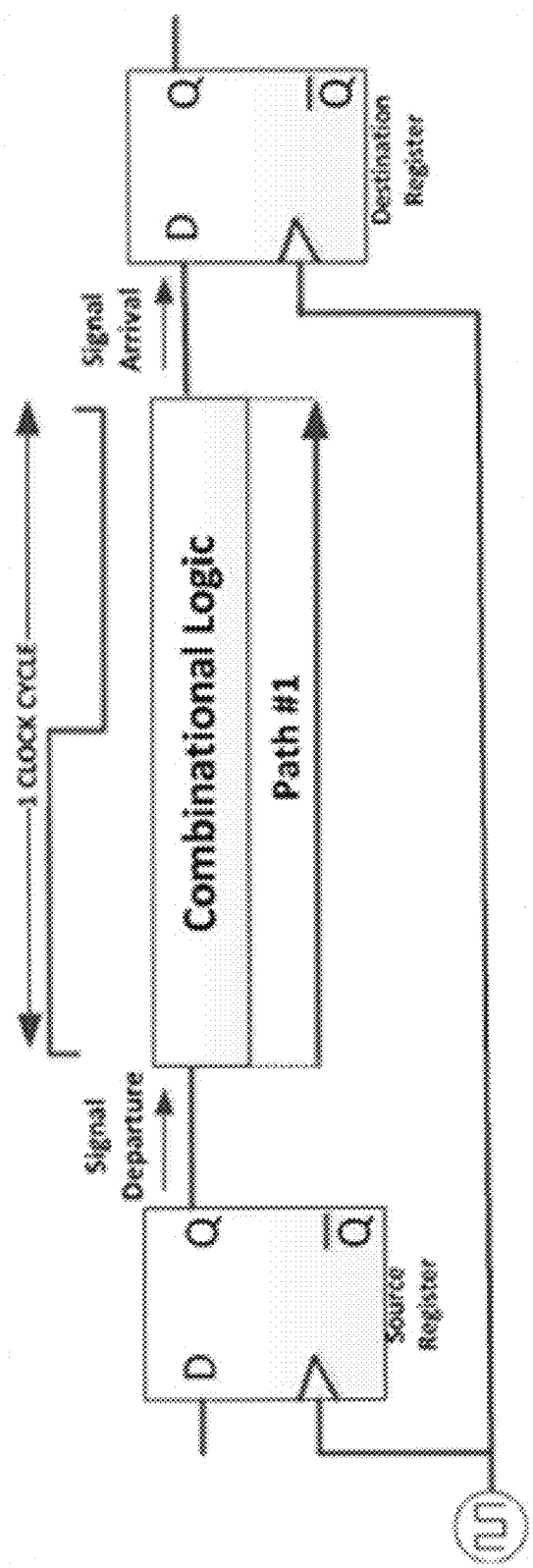
FIG. 2 is an alternative high-level schematic diagram of the exemplary synchronous digital system of FIG. 1, with emphasis on the latching, clocking and propagation delay of path 1 which is represented simply as a combinational logic circuit disposed between two registers, and defined by a propagation path delay corresponding to a minimum clock period length.

FIG. 2 is an alternative high-level schematic diagram of the exemplary synchronous digital system of FIG. 1, with emphasis on the latching, clocking and propagation delay of path 1 which is represented simply as a combinational logic circuit disposed between two registers, and defined by a propagation path delay corresponding to a minimum clock period length.

Figure 3:
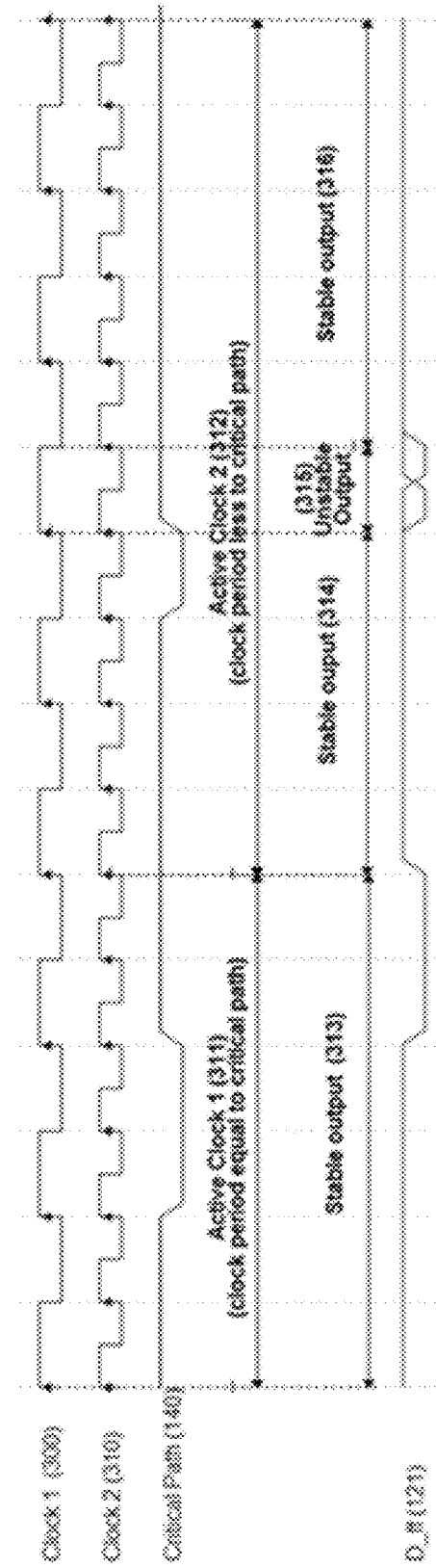
FIG. 3 is a timing diagram illustrating different clocking conditions of the combinational logic circuits in FIGS. 1 and 2 which if violated with respect to the critical path (path 1) results in undesired unstable output.

FIG. 3 is a timing diagram illustrating different clocking conditions of the combinational logic circuits in FIGS. 1 and 2 which if violated with respect to the critical path (path 1) results in undesired unstable output.

Referring to FIG. 1, a combinational circuit starts and ends with storing structures that in more common cases are registers 100, 160. The data between the registers are propagated as electrical signals through combinational circuits 170 following several routes 150, 140, 131 with different lengths. Each route is identified as a path connecting a source register 100 and a destination register 160. The crossing of a path inserts a time delay to the signal propagation. Path length variability reflects different propagation delays for the signals to arrive at their destinations. The destination registers 160 store the data results of the combinational circuit 170. In combinational paths, all the propagated signals 170 must arrive stabilized and have to be loaded in the destination registers in one clock cycle period 171. A conventional clock synchronous design to guarantee the in-time arrival of all the signals, defines a constant clock cycle period equal or higher than the longest path delay that is known as critical path 140. The current invention exploits conditions that can exceed the critical path constraint without affecting the data stability at the destination registers providing a more flexible definition of the clock cycle period. These conditions are explained in detail below.

The first condition is outlined on the assumption that if the state of a path signal is stable, the data at its destination register will also remain stable even if the clock cycle period is shorter than its propagation delay. When path 1 keeps the same signal state ("1" or "0") in a sequence of two clock cycles, for a period at the second clock cycle shorter than the propagation delay of the path 1 the result at its destination register 160 will not be influenced (see FIG. 2). The reason is that the path signal state has already been loaded at the destination register from the previous clock cycle so at the second clock cycle a shorter clock cycle period will not affect its state. However, if the state of the signal is changed, the second clock cycle period must be long enough to allow the new signal state to propagate at the destination register and to load the new state. Thus, only the path signals that switch their states introduce constraints about the clock cycle period. In the same destination register more than one path can arrive, following the same rule for each individual path.

Referring back to FIG. 2, we see that the output of destination register 121 of the critical path is examined for two different clock frequencies. Clock 1 300 represents the frequency that has period equal with the critical path delay while Clock 2 frequency 310 respects the delay of the rest paths excluding the critical. When the Clock 1 is activated 311 the changes at the critical path signal are constantly loaded at the destination register output 121. When the Clock 2 is applied 312 and the critical path 140 is stable, the output 121 remains stable 314.

When a change at the critical path 140 occurs, the output becomes unstable 315 to return again at stability 316 for stable critical path signal. The outcome is that during the operation of an integrated circuit a clock cycle period shorter than the critical path does not influence the destination registers 160 of the stable path signals. Respectively, the decisions about the clock frequency can ignore as constraints the propagation delays of the stable path signals. The last represents the first conclusion that the current invention exploits.

The second condition is that several paths can traverse the same point in an integrated circuit but only one path signal can pass in each clock cycle.

Figure 4:
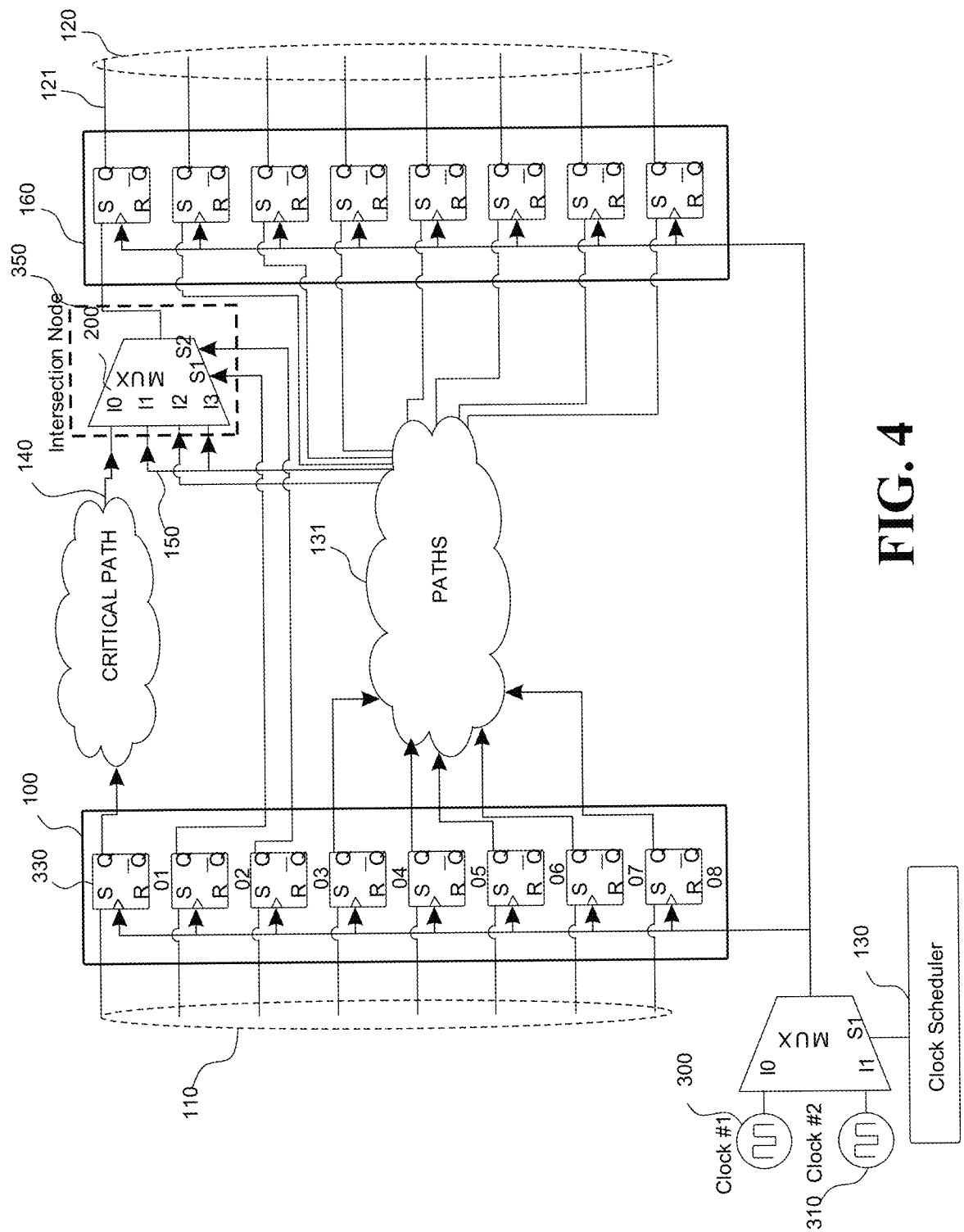
FIG. 4 is a high-level schematic diagram in accordance with an exemplary embodiment employing a clock scheduler and clock manager to support boosting of the clock frequency on a clock cycle basis as proposed herein.

FIG. 4 is a high-level schematic diagram in accordance with an exemplary embodiment employing a clock scheduler and clock manager to support boosting of the clock frequency on a clock cycle basis as proposed herein.

Referring to FIG. 4, we see that paths 140 and 150 traverse the same point 350. These points are identified as intersection nodes. In the intersection nodes, a multiplexer 200 defines which path will pass or not.

Figure 5:
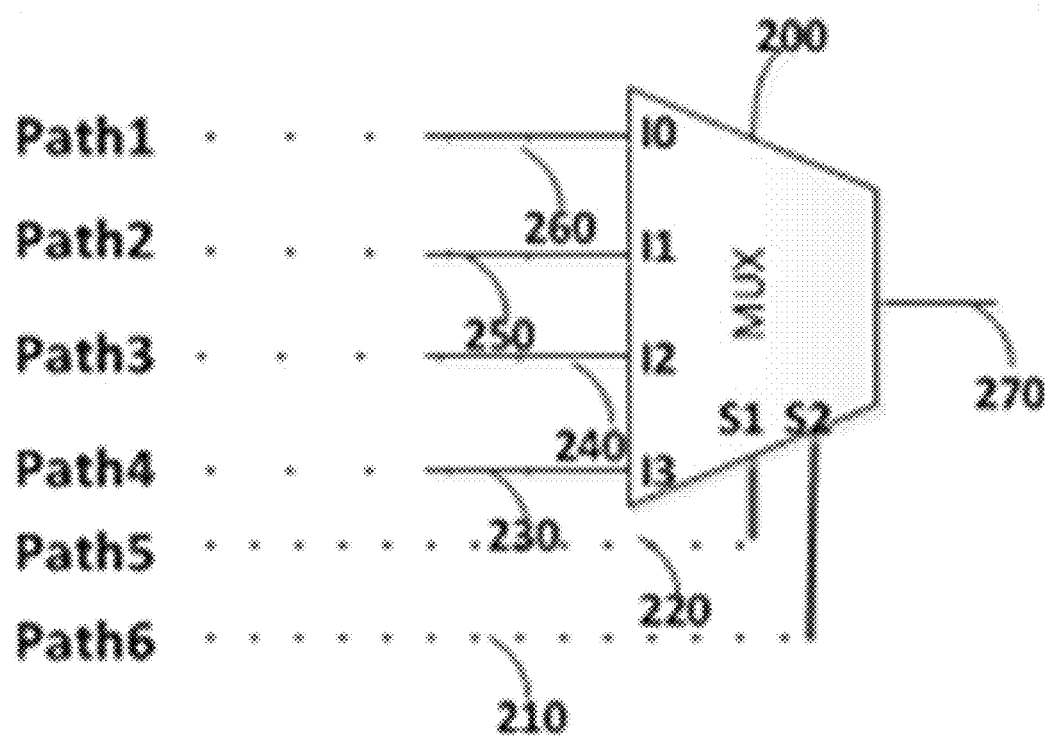
FIG. 5 is a detailed view showing the I/O and control signals of one of the multiplexer in FIG. 4.

FIG. 5 is a detailed view showing the I/O and control signals of multiplexer 200 in FIG. 4. We can see from FIGS. 4 and 5 that multiplexer 200 consists of entry signals 260, 250, 240, 230 and control signals 220, 210. The entry signals represent the potential multiplexer output while the control signals choose which entry signal will pass.

When a multiplexer does not exist as a physical entity the equivalent of a multiplexer can be defined. Each Boolean logic can be realized as a multiplexer.

Figure 6:
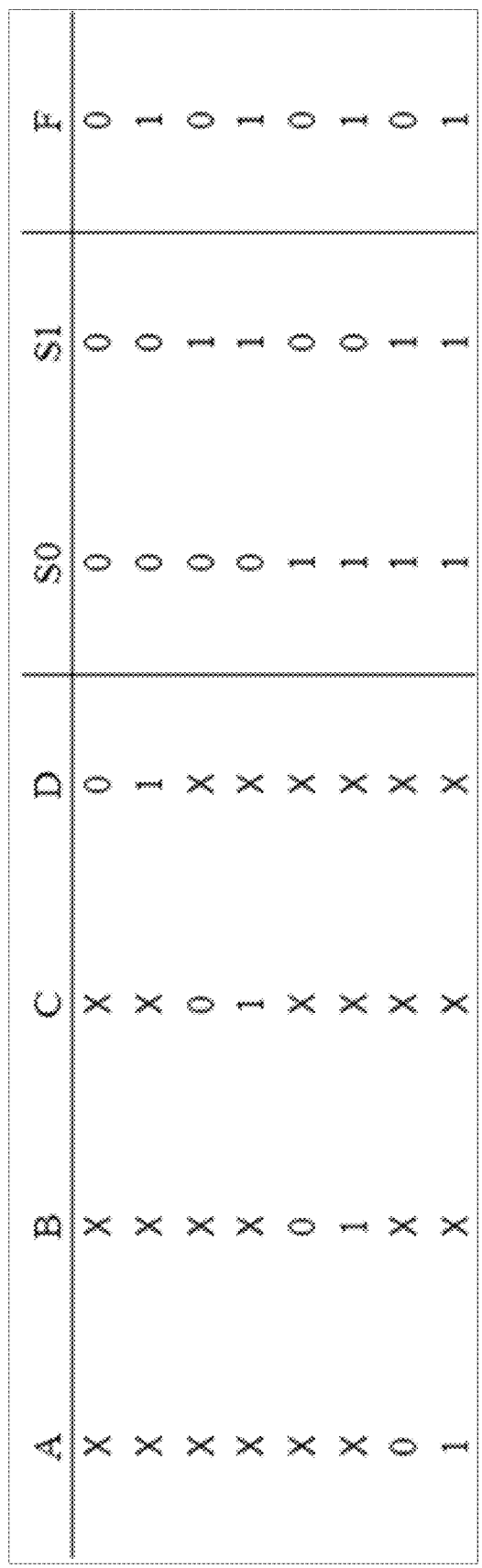
FIG. 6 is a truth table state diagram for a conventional 4:2 multiplexer.

FIG. 6 is a truth table state diagram for a conventional 4:2 multiplexer.

Referring to FIG. 6, here the we are presented with the truth table of a clear multiplexer function where A 260, B 250, C 240, D 230 represent the entry signals, S0 220 and S1 210 are the control signals and F 270 the output.

Figures 7A, 7B:
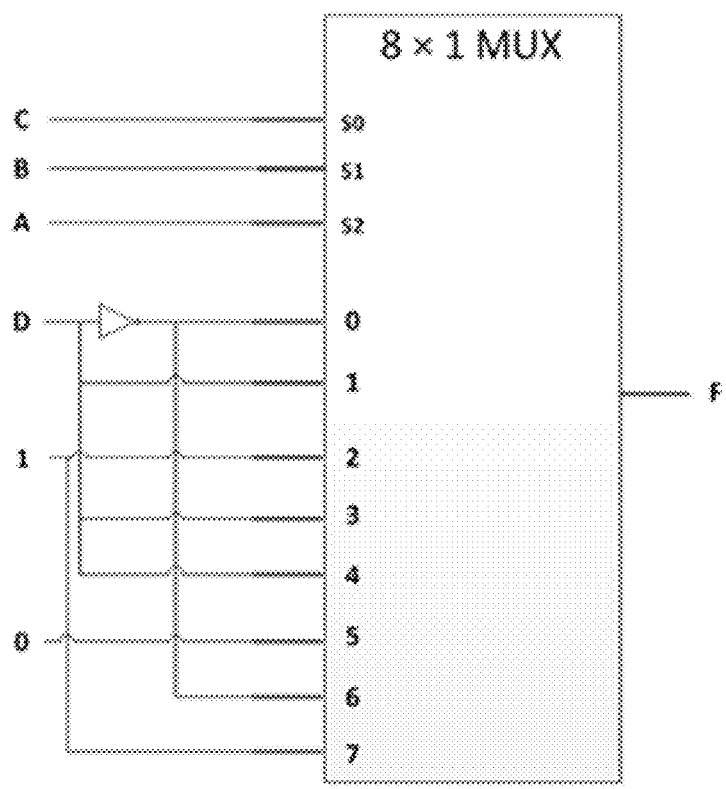
FIG. 7A is a truth table state diagram for the Boolean expression represented in the same figure.
FIG. 7B is an example component level combinational logic representation, for use as a multiplexer and configured as an interconnection node in accordance with an exemplary embodiment.

FIG. 7A is a truth table state diagram for the Boolean expression represented in the same figure. FIG. 7B is an example component level combinational logic representation, for use as a multiplexer and configured as an interconnection node in accordance with an exemplary embodiment.

Referring to FIGS. 7A and 7B, we see that control signals define which path signals will pass or not. The entry path signal that passes the intersection node is considered active while the entry signals that do not pass are inactive. The inactive paths cannot influence the operation of an integrated circuit because their propagation is blocked at the intersection nodes 350, so the corresponding path delays can be ignored.

Figure 8:
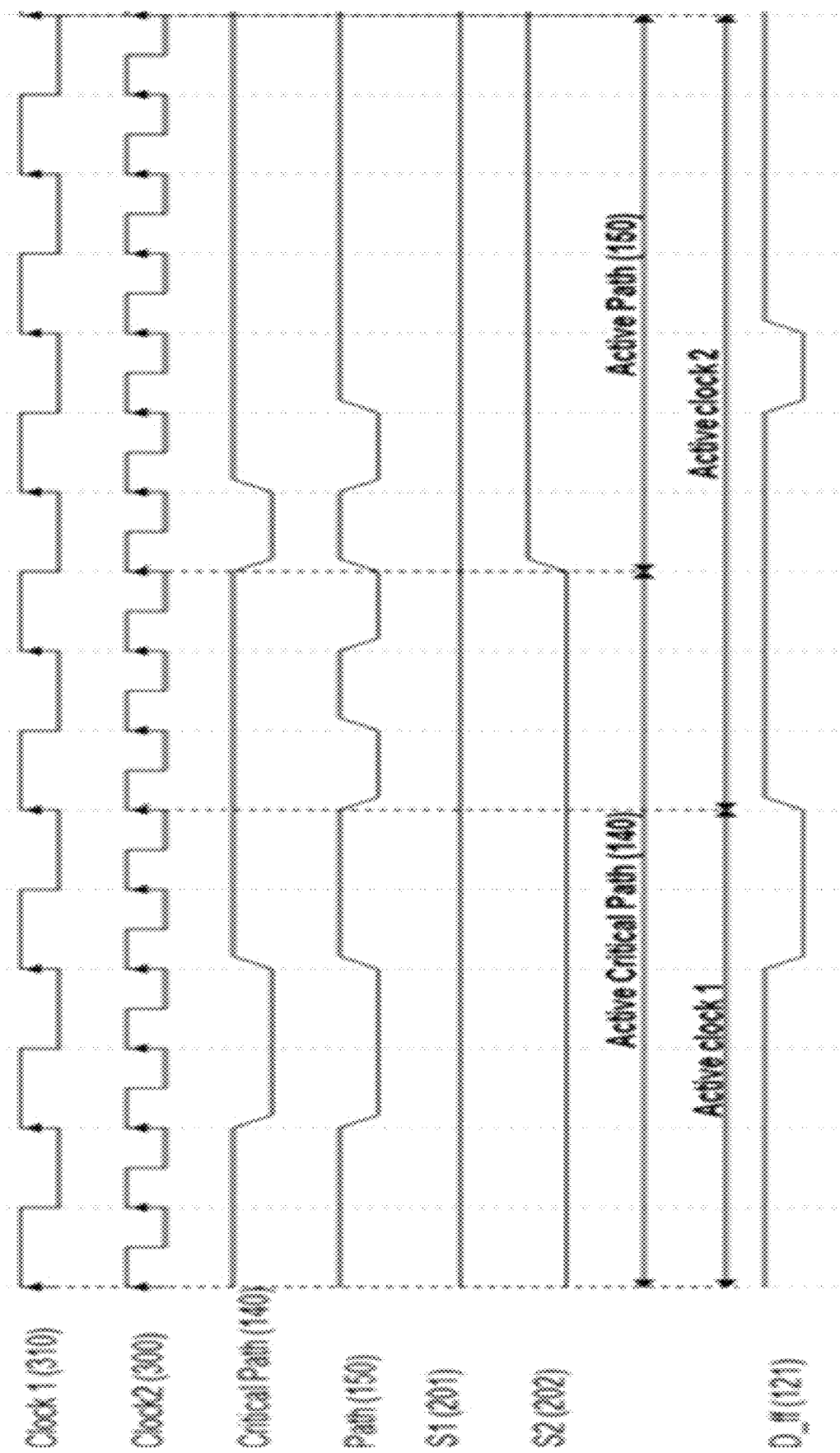
FIG. 8 is a timing diagram illustrating clock idiosyncrasies and stability relationship between a critical path and a shorter path in FIG. 4, the routes of which terminate at a common destination register.

FIG. 8 is a timing diagram illustrating clock idiosyncrasies and stability relationship between a critical path and a shorter path in FIG. 4, the routes of which terminate at a common destination register.

More specifically, FIG. 8 illustrates how a clock frequency policy exploits the activation switch between the critical path 140 and a shorter path 150 that traverse the same intersection node 350 and have a common destination register 121 avoiding signal stability issues. The frequency of the clock 1 respects the critical path 140 while the clock 2 respects only the delay of the second path 150. The control signals S1 and S2 define which path will pass the intersection node 350. For S1=0, S2=0 the critical path 140 is active while for S1=0, S2=1 the path 150 is active. The first switch from clock 1 to clock 2 is triggered while the critical path is active without impact at the output 121 due to fact that the critical path remains stable at the state "1" for the cycles that clock 2 is applied. When the path 150 is activated the changes at the critical path are ignored because they do not pass the intersection node 350 propagating only the state of path 150 that are transferred constantly in the output of the register 121. The second fundamental conclusion is that the clock cycle period can ignore the propagation delays of the inactive paths.

The third examined condition is that the control signals of the multiplexers at the intersection nodes can be part of other paths that can be also controlled by other intersection node multiplexers.

Figure 9:
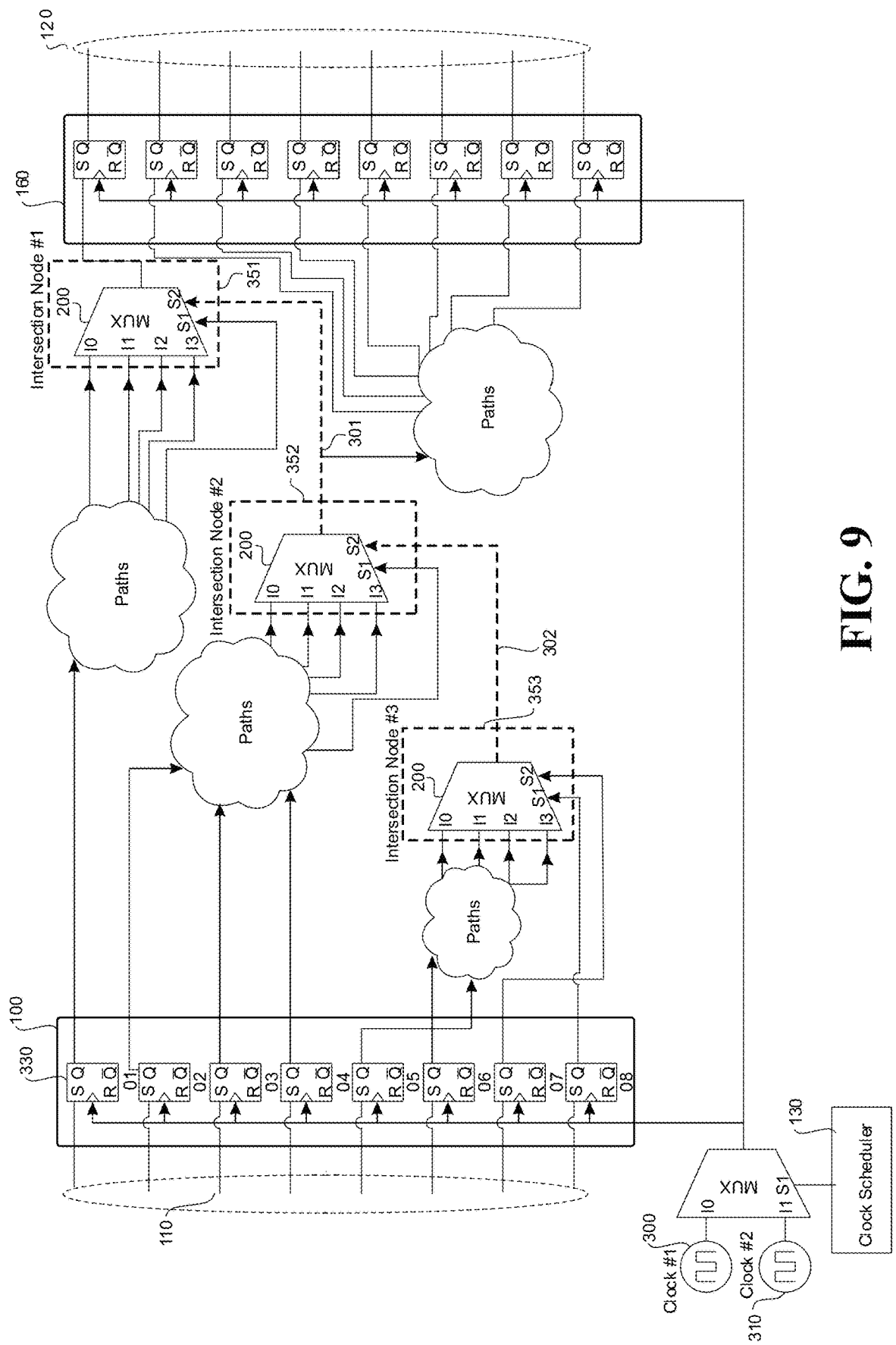
FIG. 9 is a high level schematic diagram in accordance with a further exemplary embodiment employing a clock scheduler and clock manager, but also exploiting the use of multiple interconnection nodes disposed in the combination logic, which interconnection nodes allow crossing paths traversing electrical signals up to one or more interconnection nodes and which serve to provide information which can be used by the clock scheduler to identify which critical paths shall remain unchanged in a subsequent clock cycle, and thus able to clock the entirety of the combinational logic circuit at a boosted clock frequency.

FIG. 9 is a high level schematic diagram in accordance with a further exemplary embodiment employing a clock scheduler and clock manager, but also exploiting the use of multiple interconnection nodes disposed in the combination logic, which interconnection nodes allow crossing paths traversing electrical signals up to one or more interconnection nodes and which serve to provide information which can be used by the clock scheduler to identify which critical paths shall remain unchanged in a subsequent clock cycle, and thus able to clock the entirety of the combinational logic circuit at a boosted clock frequency.

More specifically, FIG. 9 shows a multiplexer control signal 301 that operates to arbitrate the pass of the paths in intersection node 351. Intersection node 352 arbitrates the control signal 301 while intersection node 353 respectively arbitrates the control signal 302 of intersection node 352. This means that the path selection in intersection 351 is correlated with the control path signals in intersection nodes 352, 353. A recursive evaluation of the dependencies between the control signals concludes to initial parent-signals that act as a primer control of each path.

The parent signals start as input signals of source registers 110 which feed combinational circuit paths 170. Several paths can share the same initial parent-signals. Thus, a parent signal can be correlated with more than one path. A change at a parent signal could impact any of the involved paths. By studying and tracing how changes at the parent signals propagate at the intersection nodes allows us to know which combination of paths are active in response to different input stimuli. The third conclusion is that each path has parent-control signals that define when such path will be active and when not.

Outlining the conclusions that are the pillars of the present technique, the stable and the inactive paths do not influence the definition of the clock cycle period during an integrated circuit operation, while the parent-control signals (in source registers) trigger the activation or deactivation of a path defining its passage at the intersection nodes with other paths.

In accordance with an exemplary embodiment, the proposed dynamic frequency boosting technique identifies at runtime which of the paths are active and change their state in a clock cycle basis.

Figure 10:
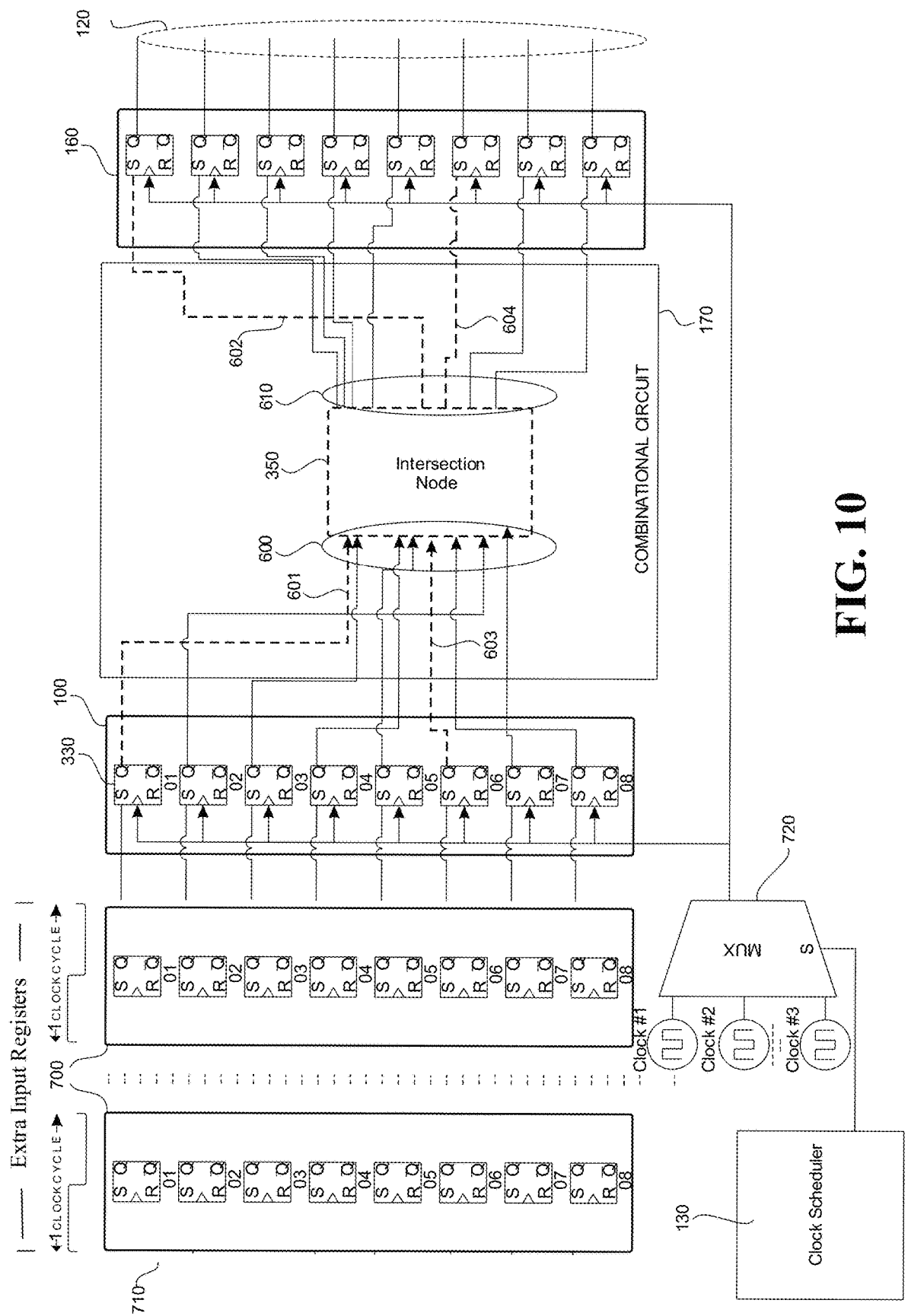
FIG. 10 is a high level schematic diagram of a combinational logic circuit employing at least one intersection node and coupled to provide change state conditions at selected points of the combinational logic circuit, while at the same time, the clock scheduler is configured to receive change state conditions from other combinational logic circuits running in parallel, such as would be the case in a multi-stage pipeline, where each pipeline stage is a distinct combinational logic circuit, all of which stages are meant to be clocked by the same clock signal, requiring the clock scheduler to set the clock frequency to accommodate a worst case delay taking into account all the stages feeding state change conditions to the clock scheduler.

FIG. 10 is a high level schematic diagram of a combinational logic circuit employing at least one intersection node and coupled to provide change state conditions at selected points of the combinational logic circuit, while at the same time, the clock scheduler is configured to receive change state conditions from other combinational logic circuits running in parallel, such as would be the case in a multi-stage pipeline, where each pipeline stage is a distinct combinational logic circuit, all of which stages are meant to be clocked by the same clock signal, requiring the clock scheduler to set the clock frequency to accommodate a worst case delay taking into account all the stages feeding state change conditions to the clock scheduler.

More specifically, scheduler 130 defines the applied clock frequency policy tracing the signal states of the source registers (parent signals) 710 (stage 1 of pipeline), 710' (stage 2 of pipeline), 710" (stage 3 of pipeline) before they feed with electrical signals the paths of corresponding combinational circuits 170. For the sake of clarification, it should be clear that only the combinational circuits of stage 3 is shown in block form. The stage 1 and stage 2 corresponding combinational circuits (which will typically be different and comprise different inputs, routes, and intersection nodes) are not shown.

By exploiting the path routing analysis that the EDA tools provide, using static timing analysis tools for example, scheduler 130 is able to be implemented so as to take into account cleverly selected state changes of an appropriately coupled subset of the available source register inputs.

It needs to be understood that the clock scheduler is configured to receive as input the state changes of relevant source registers and based on these, generate a clock selection signal, that is appropriate for the next clock cycle. Because the decision by the clock scheduler must be made in runtime and preferably in one clock cycle—and within a clock period that is no shorter than the current clock cycle (unless prepared to add extra registers equal to the extra cycles needed before each combinational circuit). It is important that the design process properly identify not only which subset of available source registers to tap the clock scheduler to, but also the number of taps that influence the scheduler's implementation cost and complexity.

Toward this end, the clock scheduler main role is to identify state values and/or state value changes at particular source registers generated in the current clock cycle, which when properly analyzed and interpreted a priori in the design phase, may be relied upon to allow the clock scheduler to automatically and dynamically generate a control signal (clock selection signal) which sets the IC to the optimum (fastest) clock period to be employed in the immediately following (new) clock cycle, without fear of introducing timing violations during this new clock cycle.

Regarding the taps, these are typically wire bond connections connecting particular the input signals (710) of the source register nodes of a stage to associated inputs on the clock scheduler. Path routing analysis at design phase must properly define the source registers to be tapped and fed as source inputs to the clock scheduler. The path analysis must select those taps, as well as number of taps, that will yield the optimum frequency boost yield for a given IC using the optimum number of taps. By way of example, path analysis will seek to identify source registers which connect to paths, which may or may not traverse intersection nodes, for which state value changes directly concern critical path criteria. It will also seek to identify source registers which serve as control signals to intersection nodes which concern critical paths.

Once the critical path analysis of a given combinational logic circuit has been analyzed and accounted for, the path with the next longest path propagation delay to the critical path may be analyzed in terms of which source registers should be tapped and fed to the clock scheduler in a similar manner.

In addition to path analysis, it should be appreciated that the design phase must also identify a suitable "number" of different clock signals that may be generated by the clock manager, as well as the optimum clock period (frequency) variability that is appropriate for a given IC. The range of frequencies is another design criteria, and one that must take into account power and energy constraints as well.

In a preferred approach, clock switching is synchronized matching the applied clock frequency to the corresponding active path signals that traverse the combinational circuit 170. Clock manager 720 feeds with a common clock signal the whole integrated circuit keeping the whole circuit operation synchronous.

The path with the highest propagation delay that is identified as active and changes its state defines the applied clock cycle period as a time equal or just higher than its delay. A clock scheduler would normally couple to the clock manager which in turns triggers an appropriate clock switch.

Figure 11A:
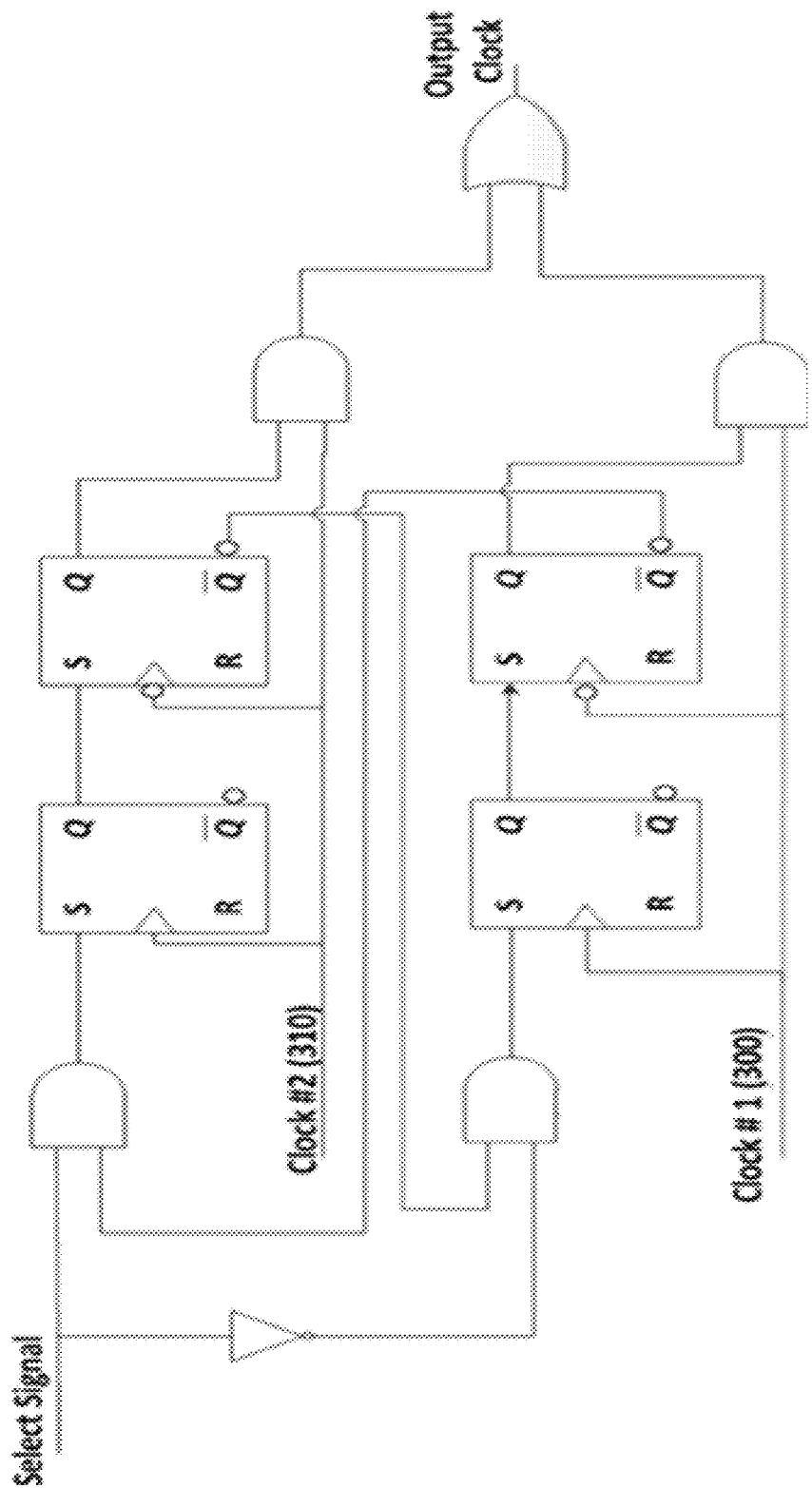
FIG. 11A is a schematic diagram of a clock manager in accordance with an exemplary embodiment driven by a conventional oscillator clock signal and the clock selection signal from the clock scheduler and configured, in response thereto, to set the IC to a boosted clock frequency, when conditions allow for this.

FIG. 11A is a schematic diagram of a clock manager in accordance with an exemplary embodiment driven by a conventional oscillator clock signal and the clock selection signal from the clock scheduler and configured, in response thereto, to set the IC to a boosted clock frequency, when conditions allow for this.

Figure 11B:
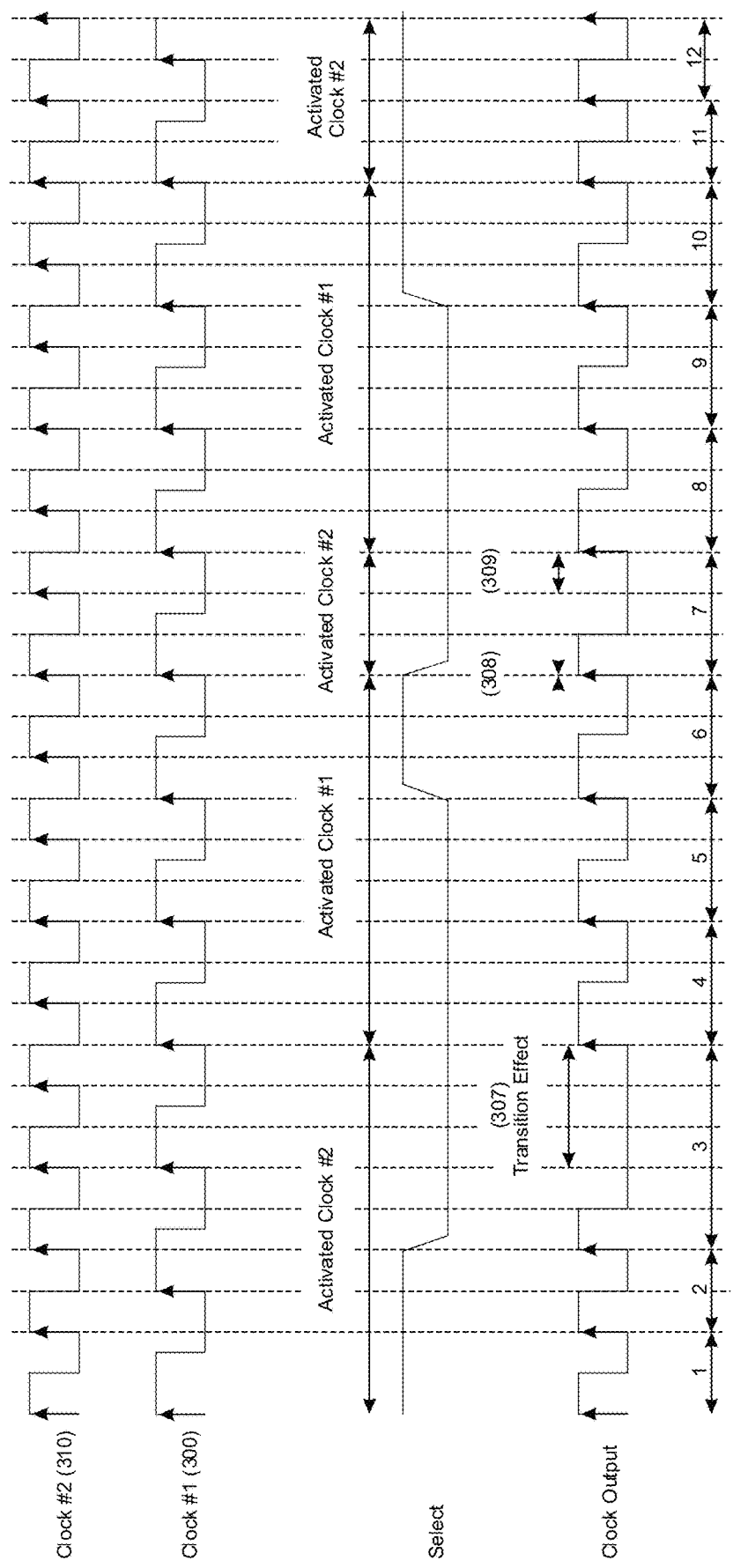
FIG. 11B is a timing diagram associated with the switching states of the clock manager shown in FIG. 11A.

FIG. 11B is a timing diagram associated with the switching states of the clock manager shown in FIG. 11A.

Referring to FIGS. 10, 11A and 11B, we see that clock manager (multiplexer) 720 drives multi-clock signals and is exploited and serves to provide a clock switch management function. To avoid clock switching glitch phenomena, a negative edge triggered D flip-flops is inserted in each driven clock signal as shown.

Feeding the clock selection signal in the subject flip-flops, a new clock switch is enabled only after the de-selection of the other clock, providing protection against the glitches at the output clock signal 720.

It should be appreciated that while a representative implementation has been shown for implementing clock management function, any equivalent clock manager implementation is not excluded from the scope of the current invention.

The implementation of the clock manager in FIG. 11A also protects against clock glitch phenomena. More specifically, the proposed design implementation introduces a glitch-free manager that leads to a loss of one clock pulse in the output clock signal 720 in respect with the select signal. This occurs because of added registers as shown in FIG. 11A.

Referring to FIG. 11B, the operation of the clock manager is shown for several cases. Clock #2 310 and Clock #1 300 are the two clocks that will be applied to the targeted integrated circuit. The select signal comes from the scheduler 130 and defines which of the clock will be applied. The clock output is the clock signal that feeds all the integrated circuit and synchronizes all the signals including the select signal. The first two clock output pulses follow the clock #2 310. At the positive edge of the third clock output pulse, the select signal changes its state triggering the clock 1 # 300. The establishment of the new clock is implemented at the fourth pulse introducing a clock cycle delay as referred previously as one clock pulse loss in the output clock signal 720 in respect with the select signal. Additionally, the switch between the two clocks has a transition effect 307 at the third pulse keeping the output pulse at the low level more than the running clock #2 310 to prevent any possible clock glitch phenomena.

A new clock switch is triggered in sixth pulse and another in the seventh pulse. In both cases the new clocks are established with one clock delay even in the extreme case of the repeated switches. The worst-case delay of the transition effect is a time equal to the period of the longest applied clock period. The delay due to the transition effect can be absorbed by the applied frequency acceleration and by the fact that the worst-case delay is not frequent. From FIG. 11A we can see from third pulse 307, the transition effect in the sixth pulse 308 and the seventh pulse 309 is minor.

The key issue is that the clock transition constantly needs one clock cycle to establish the new clock after the triggering of the selection signal. Thus, each new clock switch has one clock cycle 720 delay in respect with the selection signal that triggers this switch. The stable difference of the one clock cycle between the selection signal and the new established clock is significant to be feasible for the synchronization of the applied frequency with the path signals that trigger this clock frequency and it will be explained in detail below.

Referring to FIG. 10, the input signals 710 that feed the source registers, also feed the scheduler 130 that triggers the clock manager 720 to a new clock switch. All the integrated circuit is synchronized with the output clock signal of the clock manager 720. While the input signals 710 of the source registers are loaded in the combinational circuit at the next clock cycle, due to the intervention of the scheduler 130 and the clock manager 720 the triggering of a clock switch can require extra clock cycles to establish a new clock frequency.

Clock manager 720 adds one clock cycle delay though the clock scheduler can also add delay cycles. The total delay cycles lead to a mismatch between the path signals that traverse the combinational circuit 170 and the applied clock cycle period. Extra register levels 700 before the source register level, equal with the delay cycles (as shown in FIG. 11A) permit synchronizing the clock frequency switch exactly on the clock cycle that the corresponding path signals that trigger the clock switch are loaded to the combinational circuit. This technique permits synchronization independently of the number of clock switches without applying any functional change in the original combinational circuit.

In view of the above, it is clear that the proposed techniques exploit using a clock scheduler which identifies active signal paths that change their state triggering a clock switch that respects the identified highest path delay.

An embodiment of the present technique may exploit the identification of the active varied signal paths triggering a clock switch that partially violates some of the path delays that have a minor impact at the performance of the targeted integrated circuit. In the context of an Approximate Computing technique development, the scheduler can apply a more aggressive boosting frequency than the active paths impose taking into consideration the impact of the potential errors in the destination registers. The benefit of the current invention in such an approach is that the scheduler can define which paths are going to be violated fully controlling the permitted errors.

While the present technique focuses on the frequency boosting of an IC operation, any design improvement that exploits any of the aforementioned considerations is not excluded by the context of the current invention. The performance gain that the current technique proposes can be exploited to improve other design goals like chip area, power and energy consumption applying conventional techniques that achieve design tradeoffs.

While all the aforementioned conclusions are not excluded from the scope of the current invention the rest of the technique description concentrates on a design embodiment that aims to reduce the implementation complexity of the present invention especially in large-scale integrated circuits.

The present embodiment aims to overcome implementation difficulties of the proposed technique in large-scale integrated circuits providing an easy applicable version of the current invention. The required number of the identified paths and the exploration of the control signals can be too prohibitively complex issues for large-scale designs. The scope is to provide a flexible approach that can be applied to any integrated circuit design without requiring extra effort from the designer, exploiting only the capabilities that the EDA tools provide.

The current embodiment defines the number of the examined paths following a descending exploration of the path delays hierarchically from the critical path to shorter paths until a minimum time delay. This is a service that EDA tools support automatically. How extensive will be the exploration will define the range of the final frequency boosting. The critical path defines the low threshold of the applied frequency while the shortest explored path defines respectively the high threshold. More precisely, the minimum path delay ($t_{min}$) defines the highest frequency as $F_{max}=1/t_{min}$, while the highest path delay ($t_{max}$) represents the lowest frequency as $F_{min}=1/t_{max}$. The non-explored paths have a shorter delay than the minimum time constraint ($t_{min}$), so the $F_{max}$ as the most restricted frequency case does not violate their propagation delays.

Having a hierarchy of the most delay significant paths, the next step is to define the intersection nodes of these paths. Exploring the common passage points of the explored paths in the netlist file that the EDA tools provide, the intersections of the paths can be easily identified. While at the end of the current embodiment the exploration of the intersection nodes will not be necessary, the explanation of this simplification will be clear only at the final conclusions after a sequence of considerations that will be explained below.

A multiplexer 200 as shown previously in FIG. 4 defines the passage of the path signals at the intersection nodes. In the examined embodiment, to avoid the complexity to identify which path signals operate as control or as entry signals in the intersection node multiplexers, each path is considered that operates as control signal 220, 210 (see FIG. 5), for any of the other paths in the same intersection node. This assumption covers any potential correlation between the paths in the same intersection node. If a path operates as an entry signal 260, 250, 240, 230 and not as a control signal, this path will not influence the activation of the other paths. To avoid the investigation of each individual path, it is assumed that any change at a path signal can activate or deactivate any of the other paths in the intersection node. This assumption has impact on the clock frequency scheduling. The basic role of the scheduler in the current embodiment is to monitor the signal state changes of the explored-paths, tracing the input signal of the respecting source register (see FIG. 2) of each path and triggering a clock frequency that respects its delay constraint. To deal with the aforementioned assumption the scheduler can be modified to deal with a more restricted case, based on the worst-case delay of all the involved paths in the intersection node for each traced change of a path that traverses the intersection node. While this assumption may prove overestimated, it is exploited provisionally to disconnect the correlation between the paths in the same intersection node.

An open issue is the investigation of the impact of the paths that are not included at the path exploration (due to shorter path delays). The following paragraphs analyze why non-included paths do not influence the application of the current invention. The term included-paths refers to the paths that are included in the descending exploration of the path delays while the term non-included paths refers respectively to the paths that are not included.

Non-included paths are possible to operate as entry signal or as control signal to a multiplexer in an integrated circuit. As entry signals, non-included paths have a shorter delay than the maximum applied clock frequency period so any of the non-explored path delays cannot be violated. With respect to the control signals, two issues need consideration. The first is if non-included paths activate an included-path that changes its state, and the second is if non-included states activate an included-path that remains at the same state. Events where a non-included state activates a non-included path signal is not examined because this non-included path does not introduce any constraint due to the shorter delays of the non-included paths than the maximum applied clock frequency as explained previously. In the first scenario, the change at the state of an included path signal triggers a clock frequency that respects its delay as the basic scheduler operation, without existing any possibility for a delay violation. But in the second scenario, explained in more detail below, the scheduler does not trace any change. Accordingly, the clock frequency remains stable while an activation of an included-path is triggered. Thus, the possibility for a propagation delay violation will be examined.

Referring to FIG. 10, an included-path (combined routes 601 and 602) that is stable (its source register state is traced as stable) but its propagation can be interrupted in an intersection node 350 and to arrive only at the entry of the intersection node 600 traversing only a part 601 of the total path. A non-included path route 603 can trigger the pass of this stable path through intersection point to its destination register 160. This situation will require enough time to propagate the stable signal from the intersection node 610 at its final destination 160 through a route 602 independently of the running clock frequency because this change is not traced. To ensure this condition, the propagation delay of the remaining distance 602 has to be shorter than the most restrict clock cycle period (Fmax), as the tighter case. This condition is respected due to the following.

The non-included path (combined routes 603&604) that operates as control signal will also arrive at the entry of the intersection node 610 through a route 603 that is not part of any of the included-paths. Accordingly, if the propagation delay of 602 is higher than any of the included path delays, an included-path will exist that will combine the two routes 603 and 602 in FIG. 10 and this included path will appear at the descending exploration of the path delays. The fact that 603 is not a part of any of the explored paths means that this path does not exist. The conclusion of the aforementioned investigation is that non-included paths cannot trigger any change that might require a higher time delay than the period of the higher applied frequency. Consequently, they can be ignored.

In accordance with example embodiments, each included-path has a source register and a destination register similar to what is shown in FIG. 2. The source registers 100 feed the combinational circuit paths 170 with a state "1" or "0". If these registers switch their states, they will propagate accordingly a change at the state of all the involved-path signals that have these registers as sources. As involved-paths are considered the paths that share a common source register. Thus, the involved-paths' state changes are triggered simultaneously. A change at a source register has to respect the time constraint of the worst-case delay of the involved-paths, to ensure the in-time propagation of all the involved-path signals.

As a result, each traced change at any of the paths of an intersection node has to respect the worst delay path of the intersection node is overestimated.

The currently proposed embodiments exploit at least one other condition. More precisely, it has been proven that a clock frequency adjustment needs to respect only the delays of the varied included-path(s) that change(s) their/its state (s). Based on this assumption, the scheduler 130 that traces a change at an included-path signal applies a frequency policy based on the delay of this path (and not based on the worst intersection path delay) implementing the basic scheduling operation. The detection of simultaneous changes in multiple paths will trigger a frequency that will respect the highest varied-path delay as the most restricted case.

To verify the correctness of this scheduling approach, it has to be proved that the applied frequency policy due to the varied paths also covers the non-varied paths that are activated for propagation from the intersection nodes 350. Varied-paths are those the paths that switch their states between consecutive clock cycles, while non-varied paths are paths that are stable.

The examined scenario investigates the possibility to violate the required propagation delay of a stable path signal (601, 602) from an intersection node to its destination register 602 when this stable path signal is activated to pass an intersection node by an included path route 603 in the same direction for the non-included paths.

The scheduler cannot trace a signal propagation that begins from an intersection node 350 due to a change to another included-path signal because the scheduler traces only the changes at the source registers 100 that are at the start of the combinational circuit 170. Thus, a stable path signal does not trigger any clock frequency adjustment that ensures its delay constraint so it will be examined if the applied clock frequency can violate its propagation delay.

The applied frequency as described previously is defined by the traced changes of the included-path delays. The routes from 610 to 160 in FIG. 10 represent the potential routes from the intersection node to the destination registers. The examined scenario verifies the avoiding of a time violation if it is proven that any included-path route from 610 to 160 with higher delay than the running applied clock period cannot exist.

To trigger a switch in an intersection node multiplexer, a change to at least one path signal (603, 604) that will operate as control signal at the intersection node has to be done. The scheduler of the clock frequency traces only the included-path signal changes. The open issue is that if the applied frequency policy due to these traced changes also covers the delay requirements for any potential route from 610 to 160. This assumption is true because if a route 602 from 610 to 160 exists having a higher delay than any of the included-path, there will also exist an included-path (603, 602) that will have as parts the routes 603 and 602 and will have a common source register with the varied path (603, 604) that activates the stable path (601, 602). The reason is that the descending exploration of the path delays considers all the possible combinations of the routes including the combination of 603 and 602 routes. A traced change at a common source register will trigger a clock frequency that will respect the time constraint of the worst-case delay of the involved-paths. Thus, any of the propagation delay from 610 to 160 cannot be violated. The conclusion is that in any intersection node only the paths that change their state influence the clock frequency introducing time constraints equal with their propagation delay. This conclusion makes the exploration of the intersection nodes unnecessary as the knowledge just only the propagation delay of the varied paths is enough to be applied a clock frequency policy.

Accordingly, the proposed embodiments account for the fact that: 1) the paths that are not included at the descending exploration of the path delays can be ignored without possibility of any time violation and 2) only the included-paths that change their state influence the clock period ignoring the interaction with other paths at the intersection nodes.

This allows a circuit designer to easily employ design tool solutions that take advantage of these attribute to achieve clock frequency boosting.

The number of the included-paths can be easily controlled bounding the range of the descending exploration of the path delays while tracing the state changes at the source registers of the included-paths, a scheduler can apply at runtime clock frequency policies on a clock cycle basis. The proposed dynamic frequency boosting technique exploits a maximum clock period equal to the critical path and a minimum clock period equal to the minimum delay of the explored paths.

In an alternate embodiment (not shown), additional input registers may be added before the source registers of a combinational circuit to allow the scheduler more time (in terms of additional cycles) to trace and process the current last cycle feeds to the scheduler where one cycle only is insufficient for the hardware logic of the scheduler to complete the process.

As with conventional approaches to adjusting clock speed, the present approach of frequency boosting also allows taking into account design tradeoffs in selecting a path equalization strategy. As previously explained such design tradeoffs include accounting for any chip area constraint and performance goals, as well as power and/or energy consumption objectives.

It should be appreciated that the preferred design implementation for Application Specific Integrated Circuits (ASICs) or other Integrated Circuits (ICs) embodying the proposed frequency boosting approach technology contemplates that critical frequency boosting functions (and in particular the functions associated with the clock scheduler and clock manager) are implemented entirely in hardware logic.

Likewise, as far as design automation tools to incorporate frequency boosting functionalities in IC technology, these tools are normally pure software solutions. Software solutions vary from vendor to vendor, and range from EDA type solutions from a particular popular vendor (e.g. Cadence), to plug-in solutions from a different vendor, whose offering is intended to work with a popular vendor EDA tool, to stand-alone solutions, which are often proprietary or custom solutions designed to offer functionalities and design services to chip designers not available from traditional EDA tools, or EDA plug-in solutions in the market.

As just explained, frequency boosting functionalities may be integrated in any commercial EDA product. Such EDA product may comprise a set of functionalities aiming at aiding integrated circuit designers in designing integrated circuits of various kinds and complexities. By means of example, the functionalities offered by commercial EDA products may comprise functional description of the integrated circuit, generating netlists (i.e. lists of components and instances to be included in the integrated circuit and interconnections between the various components), generating connections and wiring of components in the integrated circuit, etc. EDA software product functionalities may be executed at one or more processors, each having at least one core, or at the cloud.

Additionally, the design and testing functionality of the frequency boosting and the respective Clock Scheduler and Clock (frequency) Manager may be offered together with the standard design functionalities forming part of the EDA (e.g. graphical design, etc.). Such implementation may be done in any software programming language of choice of the producer of the EDA product. As a result, the proposed techniques may be offered in the basic EDA product sold by the respective producers. This will make the proposed techniques available to all users of these EDA products and will facilitate the users in including clock frequency boosting in the ICs designed with these EDA products.

In an alternative exemplary embodiment, the techniques of the present invention may be implemented as a software plug-in for EDA products. The programming language of choice for the development of the plug-in is open to its developer assuming a suitable Software Development Kit (SDK) is used. In such an exemplary embodiment of the current invention, the user of an EDA product will have access to the proposed techniques only if he buys the plug-in and installs the plug-in at his EDA product. Otherwise the user will not be able to use clock frequency boosting in his IC designs. The plug-in may be offered for download by the EDA producer, or from one or more third party suppliers. Exemplary suppliers may include sites like Amazon, Google Play, Apple Store, or any other web service for software sale and downloading. In a modification of this exemplary embodiment, the plug-in may be offered as software stored in a storage medium which the EDA user (i.e. the client) may buy and install at his computer.

A third approach, as previously mentioned, is a stand-alone solution. The stand-alone approach is suitable for more complex or very sophisticated design adaptations to existing netlists, where for example, an ASIC designer may wish to include frequency boosting functionalities on-chip and a more cost-effective approach is to have a third party do this, rather than do it herself. In some cases, the hardware IP of the stand-alone solution is proprietary, in which case, the ASIC designer may have no choice but to work with the third party directly.

While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of a preferred embodiment and best mode of the invention known to the applicants at the time of filing the application has been presented and is intended for the purposes of illustration and description. It is not intended to be exhaustive or limit the invention to the precise form disclosed and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

What is claimed is:

1. A device including a clock scheduler and a synchronous digital system, the synchronous digital system including a combinational circuit of one or multiple pipeline stages defined by a plurality of circuit paths of varying path delays and a plurality of registers as starting points of these circuit paths, the synchronous digital system being configured to operate in a more optimum clock frequency in response to a clock selection signal generated by the clock scheduler, wherein the clock scheduler detects the switching of signal state values at the inputs of a subset of selected starting point registers, wherein the subset comprises the starting point registers of those paths which are going to be propagated at intersection nodes during the next clock cycle of operation, and on the basis thereof causing hardware logic in the clock scheduler to determine worst-case path delays of the combinational circuit during the next clock cycle of operation and, in response thereto, generate a clock selection signal to set the synchronous digital system to the more optimum clock frequency in this next cycle of operation.

2. The device of claim 1, wherein a switching in signal state value refers only to the change itself and not being a 0-bit value or a 1-bit value.

3. The device of claim 2, wherein the combinational circuit comprises a data pipeline comprised of a sequence of stages, and the registers are the data starting points at the beginning of each of the sequence of stages.

4. The device of claim 3, where the registers store the output values of a preceding stage in the data pipeline generated during the cycle of operation preceding the next clock cycle of operation.

5. The device of claim 4, further comprising a clock manager that generates the more optimum clock frequency in response to the generated clock selection signal from the clock scheduler.

6. The device of claim 1, wherein at least one of the plurality of circuit paths includes at least one multiplexer circuit each defining at least one intersection node that logically divide a given stage into one or more sub-stages, the clock scheduler being further configured to determine what paths are actively propagated at what pipeline stages, to sense signal state values at predetermined intersection nodes and to use those sensed signal state values for the generation of the clock signal.

7. The device of claim 1, wherein the worst-case path delays are derived from slack timing analysis and configured to avoid negative slack and provide a minimum possible positive slack.

8. The device of claim 1, wherein the clock scheduler is designed to execute a clock frequency switching policy created using an appropriate electronic design automation (EDA) tool, the switching policy being the result of path analysis employed by the tool on the combinational circuit to identify path propagation delays and on the basis in part thereof, identify the subset of the registers of selected circuit paths that will be fed to the clock scheduler.

9. The device of claim 8, wherein the EDA tool is at least one of a plug-in and a standalone software solution configured to:
  identify a netlist, which netlist comprises a list of components and instances defining the synchronous digital system as well as the intersection nodes between the various components; and
  amend the netlist to add the functionalities associated with the clock scheduler generating clock selection signals.

10. The device of claim 8, wherein the EDA tool is a stand-alone software solution configured to generate a netlist, which netlist comprises a list of components and instances defining the combinational circuit as well as the intersection nodes between the various components in the combinational circuit, as well as define the components associated with the hardware logic in the clock scheduler.

11. The device of claim 1, wherein for any given single pipeline operation that results in the setting of a change in clock frequency in the next clock cycle, both the entire single pipeline operation and the change in clock frequency occur within the cycle of operation preceding said next clock cycle of operation.

12. A non-transitory computer program product configured to operate as an EDA tool to assist a circuit designer to design a device including a clock scheduler and a synchronous digital system, the synchronous digital system including a combinational circuit of one or multiple pipeline stages defined by a plurality of circuit paths of varying path delays and a plurality of registers as starting points of these circuit paths as well as intersection nodes, the synchronous digital system being configured to operate in a more optimum clock frequency in response to a clock selection signal generated by the clock scheduler, wherein the clock scheduler detects the switching of signal state values at the inputs of a subset of selected starting point registers, wherein the subset comprises the starting point registers of those paths which are going to be propagated at intersection nodes during the next clock cycle of operation, and on the basis thereof causing hardware logic in the clock scheduler to determine worst-case path delays of the combinational circuit during the next clock cycle of operation and, in response thereto, to generate a clock selection signal to set the synchronous digital system to the more optimum clock frequency in this next cycle of operation, the computer program product including instructions that cause the EDA tool to:
 identify a netlist, which netlist comprises a list of components and instances defining the synchronous digital system as well as interconnection nodes between the various components; and
 amend the netlist to add the functionalities associated with the clock scheduler to facilitate its selecting the clock selection signal,
 wherein the worst-case path propagation characteristics are derived from slack timing analysis and configured to avoid negative slack and provide a minimum possible positive slack.

13. A non-transitory computer program product configured to operate as an EDA tool to assist a circuit designer to design a device including a clock scheduler and a synchronous digital system, the synchronous digital system including a combinational circuit of one or multiple pipeline stages defined by a plurality of circuit paths of varying path delays and a plurality of registers as starting points of these circuit paths as well as intersection nodes, the synchronous digital system being configured to operate in a more optimum clock frequency in response to a clock selection signal generated by the clock scheduler, wherein the clock scheduler detects the switching of signal state values at the inputs of a subset of selected starting point registers, wherein the subset comprises the starting point registers of those paths which are going to be propagated at intersection nodes during the next clock cycle of operation, and on the basis thereof causing hardware logic in the clock scheduler to determine worst-case path delays of the combinational circuit during the next clock cycle of operation and, in response thereto, to generate a clock selection signal to set the synchronous digital system to the more optimum clock frequency in this next cycle of operation, the computer program product including instructions that cause the EDA tool to:
 generate a netlist, which netlist comprises a list of components and instances defining the combinational circuit as well as intersection nodes between the various components in the combinational circuit, as well as define the components associated with the clock scheduler,
 wherein the worst-case path propagation characteristics are derived from slack timing analysis and configured to avoid negative slack and provide a minimum possible positive slack.

14. A computer implemented method for use with an EDA tool that assists a circuit designer to design a device including a clock scheduler and a synchronous digital system, the synchronous digital system including a combinational circuit of one or multiple pipeline stages defined by a plurality of circuit paths of varying path delays and a plurality of registers as starting points of these circuit paths as well as intersection nodes, the synchronous digital system being configured to operate in a more optimum clock frequency in response to a clock selection signal generated by the clock scheduler, wherein the clock scheduler detects the switching of signal state values at the inputs of a subset of selected starting point registers, wherein the subset comprises the starting point registers of those paths which are going to be propagated at intersection nodes during the next clock cycle of operation, and on the basis thereof causing hardware logic in the clock scheduler to determine worst-case path delays of the combinational circuit during the next clock cycle of operation and, in response thereto, generate a clock selection signal to set the synchronous digital system to the more optimum clock frequency in this next cycle of operation, the method of designing the device comprising:
 identifying a previously created netlist, which netlist comprises a list of components and instances defining the synchronous digital system as well as intersection nodes between the various components;
 performing path analysis on the combinational circuit to identify, in part, path propagation delays and intersection nodes of the circuit paths;
 defining a clock frequency switching policy based on the results of the path analysis;
 identifying, based on the path analysis, the subset of registers of selected circuit paths that will be fed those inputs to the clock scheduler; and
 amending the netlist to add the functionalities associated with the clock scheduler to facilitate its generating the clock selection signal.

15. A computer implemented method for use with an EDA tool that assists a circuit designer to design a device including a clock scheduler and a synchronous digital system, the synchronous digital system including a combinational circuit of one or multiple pipeline stages defined by a plurality of circuit paths of varying path delays and a plurality of registers as starting points of these circuit paths as well as intersection nodes, the synchronous digital system being configured to operate in a more optimum clock frequency in response to a clock selection signal generated by the clock scheduler, wherein the clock scheduler detects the switching of signal state values at the inputs of a subset of selected starting point registers, wherein the subset comprises the starting point registers of those paths which are going to be propagated at intersection nodes during the next clock cycle of operation, and on the basis thereof causing hardware logic in the clock scheduler to determine worst-case path delays of the combinational circuit during the next clock cycle of operation and, in response thereto, to generate a clock selection signal to set the synchronous digital system to the more optimum clock frequency in this next cycle of operation, the method of designing the device comprising:
 performing path analysis on the combinational circuit to identify, in part, path propagation delays and intersection nodes of the circuit paths;
 identifying, based on the path analysis, the subset of registers of selected circuit paths that will be fed those inputs to the clock scheduler; and
 generating a netlist, which netlist comprises a list of components and instances defining the circuit as well as intersection nodes between the various components in the combinational circuit, as well as define the components associated with the clock scheduler.

\* \* \* \* \*